United States Patent [19]
Becicka et al.

[11] Patent Number: 5,098,254
[45] Date of Patent: Mar. 24, 1992

[54] PROXIMITY DETECTION MEANS ON A PALLETIZER HAND ASSEMBLY

[75] Inventors: Kenneth F. Becicka, Alvin; Thomas R. Reed, Danville; Ray A. Yourgalite, Hoopeston; Neal C. Chamberlain, Hoopeston; Steven L. Hufford, Hoopeston, all of Ill.

[73] Assignee: FMC Corporation, Chicago, Ill.

[21] Appl. No.: 242,671

[22] Filed: Sep. 12, 1988

[51] Int. Cl.$^5$ ............................................. B65G 57/02
[52] U.S. Cl. ............................... 414/792.9; 414/792.6; 414/794.6; 901/14; 901/35
[58] Field of Search ............... 414/791.6, 792.6, 792.7, 414/792.8, 792.9, 794.6, 274, 718, 728, 730, 749, 750, 751, 752, 753; 901/13, 14, 16, 21, 23, 35

[56] References Cited

U.S. PATENT DOCUMENTS

| | | | |
|---|---|---|---|
| 2,508,861 | 5/1950 | Jessen | 414/792.6 X |
| 4,299,496 | 11/1981 | Lord | 414/274 X |
| 4,419,035 | 12/1983 | Stobb | 414/792.9 X |
| 4,519,740 | 5/1985 | Stobb | 414/792.9 X |
| 4,557,657 | 12/1985 | Olson et al. | 901/14 X |
| 4,597,707 | 7/1986 | Cornacchia | 901/16 X |
| 4,723,884 | 2/1988 | Brinker et al. | 901/35 X |

FOREIGN PATENT DOCUMENTS 8607579  12/1986  World Int. Prop. O. ............ 901/14

Primary Examiner—H. Grant Skaggs
Attorney, Agent, or Firm—Richard B. Megley; Douglas W. Rudy

[57] ABSTRACT

A robotic palletizer including a vertical column, a telescoping horizontal arm mounted for vertical movement along the column and a hand assembly mounted at the end of the horizontal arm. A pair of photodetectors, movable with the hand assembly, sense the presence and location of cartons in place on a pallet being loaded and signal the palletizer when the vertical height and horizontal extension of the hand assembly are sufficient to place cartons in the proper position for loading onto the pallet. A circuit controls operation of the palletizer in accordance with the sizes and shapes of the cartons and pallets and permits limited variation of the loading pattern provided by the palletizer. Separate conveyors transport cartons to the palletizer for loading and remove loaded pallets from the palletizer upon completion of the loading cycle.

2 Claims, 2 Drawing Sheets

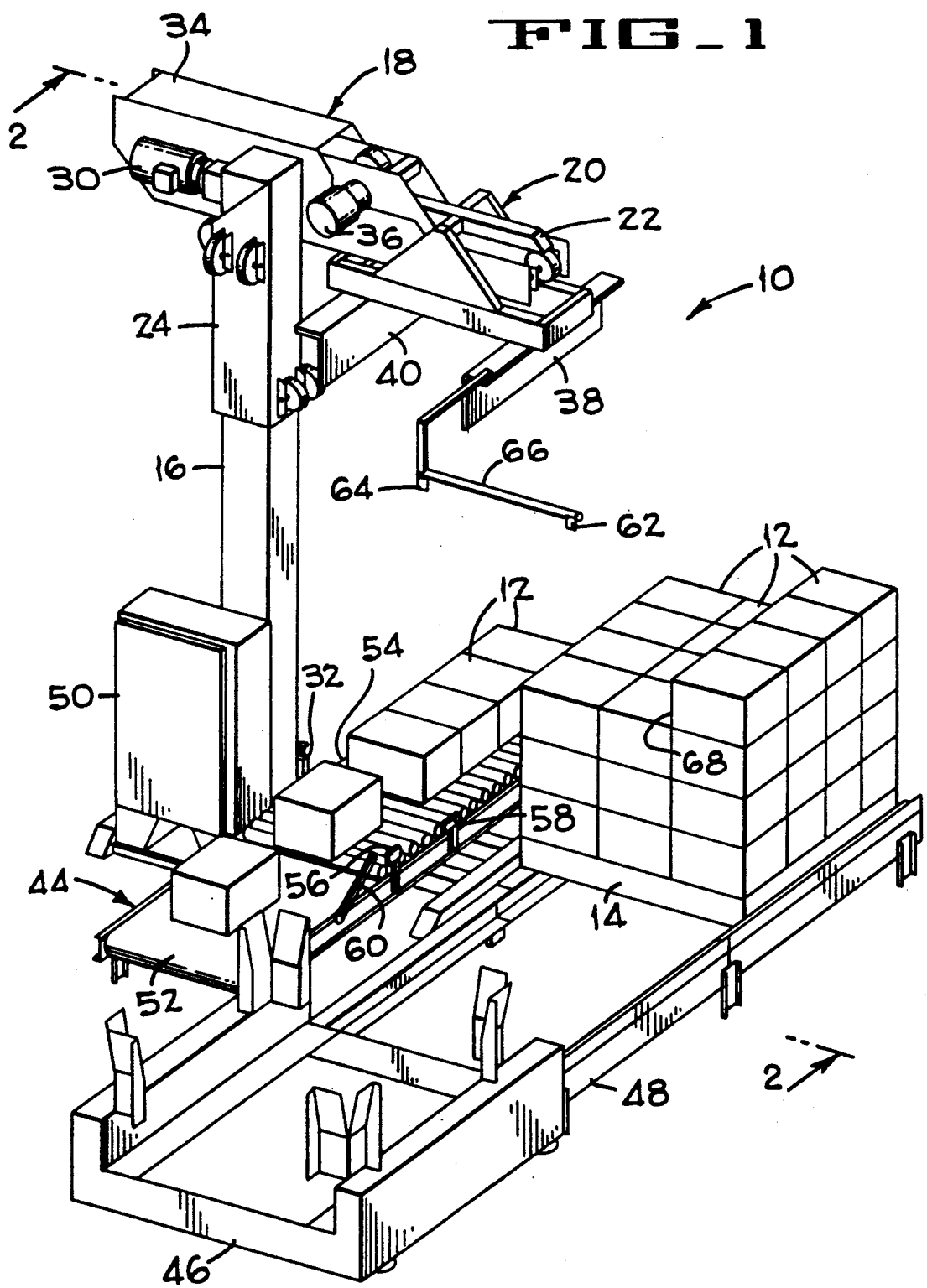

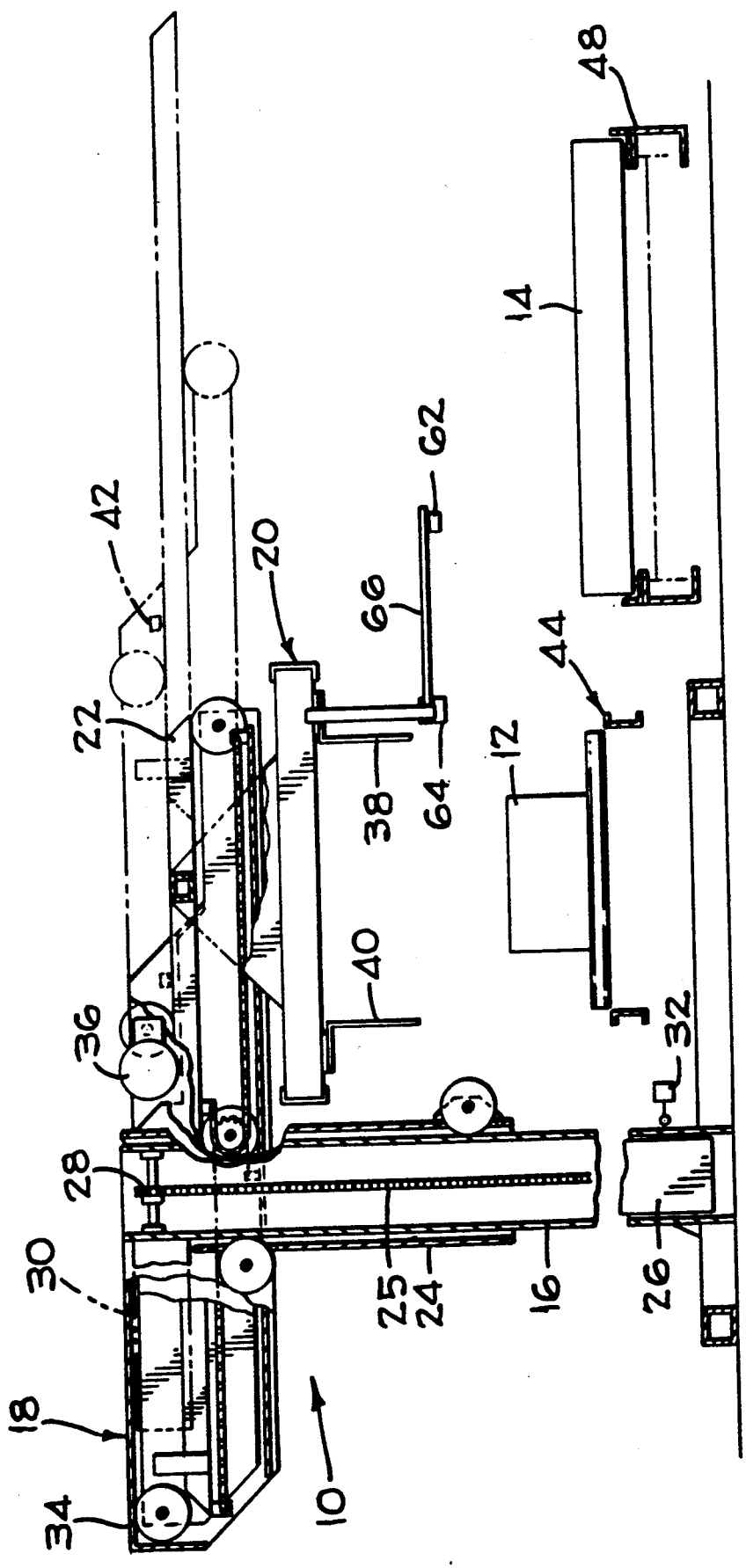
FIG_2

PROXIMITY DETECTION MEANS ON A PALLETIZER HAND ASSEMBLY

BACKGROUND OF THE INVENTION

This invention relates generally to palletizers and, more particularly, to robotic palletizers operable to automatically lift and place cartons onto a pallet in a predetermined pattern or arrangement.

As one of the final steps in many manufacturing operations it is necessary to load containers of manufactured products onto pallets for shipment from the manufacturing facility, In high speed, high volume, manufacturing operations, such loading or "palletizing" can be very labor-intensive if performed manually; and a variety of machines or "palletizers" have been developed for automatically performing this function.

Because substantial savings in labor costs can be realized when automatic palletizing is utilized in high speed, high volume operations, such palletizing can be economically justified despite a relatively high initial cost and demanding service requirements for each such palletizing machine. In low speed, low volume operations, however, the potential labor cost savings are far lower, and an automatic palletizer should have a simpler construction and have a relatively lower initial cost if it is to provide a significant economic advantage over manual palletizing.

Prior palletizers have utilized electronic and mechanical encoders, in combination with a computer-based control system, to keep track of the actual position of a carton as it is transported and placed onto a pallet. Although effective, the use of such encoders significantly increases the cost of such prior palletizers, requires service skills of experts and renders such palletizers economically unsuitable for use in low speed, low volume palletizing applications.

In view of the foregoing, it is a general object of the present invention to provide a new and improved robotic palletizer.

It is a more specific object of the present invention to provide a new and improved robotic palletizer which can be economically manufactured and serviced and which can be advantageously utilized in low speed, low volume palletizing operations.

SUMMARY OF THE INVENTION

The invention provides a robotic palletizer operable to automatically place and arrangement a plurality of objects in a predetermined pattern on a pallet. The robotic palletizer includes a hand assembly adapted to releasably grasp one or more of the objects and further includes a support assembly operable to support the hand assembly for independent movement in a substantially vertical direction and also in a substantially horizontal direction. Proximity detectors, movable with the hand assembly, sense the presence and absence of accumulated objects on the pallet to control the position and elevation of the hand assembly for placing objects on the pallet.

BRIEF DESCRIPTION OF THE DRAWINGS

The features of the present invention are set forth with particularlity in the appended claims. The invention, together with the objects and advantages thereof, can best be understood by reference to the following description taken in conjuction with the accompanying drawings wherein like reference numerals identify like elements, and;

FIG. 1 is an isometric view of a robotic palletizer embodying various features of the invention; and FIG. 2 is a cross-sectional view of the robotic palletizer illustrated in FIG. 1 taken along line 2—2 thereof

DESCRIPTION OF THE PREFERRED EMBODIMENT

A robotic palletizer 10 embodying one form of the invention is illustrated in the Figures. The robotic palletizer 10 functions to receive a plurality of regularly shaped objects, such as shipping packages, cases or cartons 12, and automatically place the cartons 12 in a predetermined pattern on a shipping pallet 14.

As illustrated, the robotic palletizer 10 includes a vertical support column, or "Z" axis 16, and an extendable horizontal arm or "Y" axis assembly 18 mounted for bi-directional vertical movement along the "Z" axis 16. A hand or grasping assembly 20, adapted to releasably grasp at least one and preferably a plurality of the cartons 12, is mounted to an extendable end 22 of the "Y" axis assembly 18. The hand assembly 20 is thus supported by the "Z" axis 16 and by the "Y" axis assembly 18 for independant movement in both the vertical and horizontal directions. Preferably, the "Y" axis assembly 18 comprises a telescoping horizontal arm as shown and described in the co-pending application of Becicka, et al., entitled "Double Telescoping Arm for Robotic Palletizers and the Like", filed currently herewith and incorporated by reference herein.

The "Y" axis assembly 18 is supported for vertical movement along the "Z" axis 16 by means of a carriage 24 movable along the vertical column 16. A chain 25 (FIG. 2) is attached at one end to the carriage 24 and at the other end to a counterweight 26 within the vertical column 16. The chain 25 is also reeved over a sprocket 28 located at the top of the column 16. When the sprocket 28 is turned by means of an electric motor 30, the chain is driven in one direction or the other to cause the carriage 24 to move up or down along the vertical column 16. An adjustable limit switch 32 is provided for sensing when the carriage 24 has reached a predetermined lower limit relative to the vertical column 16.

As set forth in greater detail in the referenced copending application of Becicka et al., the "Y" axis assembly 18 includes one end 34 which remains horizontally stationary relative to the vertical column 16. The extendable end 22 is driven horizontally inwardly or outwardly relative to the vertical column 16 under the power of an electric drive motor 36. The hand assembly 20 includes an outer hand plate or palm 38 and a parallel inner hand plate or palm 40 which can be driven toward or away from the outer hand plate 36. The hand assembly 20 can thereby grasp a row of the cartons 12 for placement onto the pallet 14, or can release the cartons 12 onto the pallet 14. An adjustable limit switch 42 (FIG. 2) is provided for sensing when the "Y" axis assembly 18 has been extended to a predetermined limit.

The robotic palletizer further includes an infeed conveyor 44, a pallet dispenser 46 in which empty pallets 14 are stored, and a pallet conveyor 48 which conveys the empty pallets 14 from the dispenser 46 to a loading position shown in FIG. 1. A user control panel 50, containing suitable control circuitry, is provided for controlling operation of the palletizer 10.

The infeed conveyor 44 functions to meter orient and accumulate the cartons 12 prior to loading onto the pallet 14. The infeed conveyor 44 receives the cartons 12 from an upstream conveyor (not shown), such as a gravity or low back pressure conveyor. The infeed conveyor 44 includes a low-speed section 52 and a high-speed section 54 downstream of the low-speed section 52. Because of the speed differential between these high-speed and low-speed sections, the cartons 12, which have been initially conveyed onto the low-speed section 52, automatically become spaced apart as they encounter the high-speed section 54. Upon reaching the end of the high-speed section 54, the cartons 12 are stopped and accumulated. A first photodetector 56, responsive to the passage of each of the cartons 12, counts the cartons 12 as each enters the high-speed section 54 of the conveyor 44. This information is provided to the control circuitry. As the cartons 12 pass the photodetector 58 (also responsive to the passage of each of the cartons 12) into the accumulation area of the conveyor 44, this information is also provided to the control circuitry for detecting completion of a row of the cartons 12 in the accumulation area.

The infeed conveyor 44 is configured so that a sufficient number of the cartons 12 are accumulated at one time to form one row in each layer on the loaded pallet 14. The cartons 12 can thus be accumulated in side-by-side relationship as shown in FIG. 1. In the alternative, a carton turning mechanism 60, located adjacent the inlet end of the high-speed section 54, can be actuated by the control circuitry to place the cartons 12 in end-to-end relationship as they are accumulated.

The positions of the cartons 12 and the hand assembly 20 relative to the pallet 14 are sensed by proximity detector means. The proximity detector means senses the presence and absence of the accumulated cartons 12 on the pallet 14 to control the position of the hand assembly 20 for placing the cartons 12 on the pallet 14. For example, one can use a pair of proximity detectors 62 and 64 mounted on a support 66 which extends horizontally outwardly from the hand assembly 20. In the illustrated embodiment, the first and second proximity detectors 62 and 64 each preferably comprise an infrared photodetector system including a self-contained infrared source and infrared detector. The horizontal support 66 is located such that when the hand assembly 20 is in position over the pallet 14, the support 66 extends adjacent and alongside the cartons 12 in place on the pallet 14. The support 66 is also positioned to be roughly one inch above the bottom surface of the cartons 12 being carried by the hand assembly 20.

The first proximity detector 62 is located substantially at the outermost end of the support 66 and faces toward the sides of the cartons 12 in place on the pallet 14. The first proximity detector is movable with the hand assembly and operable for generating a first control signal characteristic of the vertical position of the hand assembly. The second proximity detector 64 as positioned slightly outboard of the outer hand member 38 and also faces toward the sides of the cartons 12 in place on the pallet 14. The second proximity detector is also movable with the hand assembly and operable for generating a second control signal characteristic of the horizontal position of the hand assembly. Thus both proximity detectors face the same way, that is, toward the sides of the cartons being handled.

During a pallet loading operation the first and second proximity detectors 62 and 64 operate in conjuction with control means, such as suitable microprocessor based control circuitry in the control panel 50. These proximity detectors 62 and 64 function to sense the position of the hand assembly 20 relative to the cartons 12 already in place on the pallet 14. In particular, the first proximity detector 62 operates to generate a first control signal characteristic of the vertical position of the hand assembly 20 relative to the presence or absence of a carton. Thus, the first proximity detector 62 senses when the height of the hand assembly 20 is sufficient to provide vertical clearance between the cartons 12 already in place on the pallet 14 and the cartons 12 in the grasp of the hand assembly 20. Similarly, the second proximity detector 64 operates to generate a second control signal characteristic of the horizontal position of the hand assembly 20 relative to the presence or absence of a carton. Thus, the second proximity detector 64 senses when the horizontal extension of the horizontal arm 18 is sufficient to place the outermost edge of the grasped cartons 12 adjacent the innermost edge 68 of the top row of the cartons 12 already in place.

Within the control panel 50, the control circuitry operates to control the palletizer 10 in accordance with: (a) various user-generated predetermined control inputs, (b) by the inputs, or control signals, provided by the above discussed photodetectors 56, 58 and the proximity detectors 62, 64 and (c) by the various limit switches 32, 42. Preferably, the control system comprises a programmed commercially available, microprocessor-based circuit, such as the "SLC150" processor manufactured by Allen Bradley Company as part no. 1745-LP 153. Programming of the control system involves entering various predetermined operational data, such as the number of the cartons 12 per row; the orientation of each of the cartons 12 within the row, spacing (per user requirements) between the adjacent cartons 12 within the row and the total number of the cartons 12 for a fully loaded form of the pallet 14. This predetermined operational data and the control signal information is manipulated by a computer software program (the source code output of the program is set forth in the attached Software Appendix). Control of the robotic palletizer 10 is thus effectuated in accordance with execution of the computer program instructions which utilize the predetermined operational data input by the user and the control signal information as the variable parameters. The cartons 12 are then conveyed onto the low-speed section 52 of the infeed conveyor 44. When a sufficient number of the cartons 12 have been accumulated to form one row on the pallet 14, the hand assembly 20 closes to grip the accumulated cartons 12.

With reference to the partially loaded pallet 14 as shown in FIG. 1, when the pallet 14 is initially empty, the first row of the cartons 12 is positioned on the pallet 14 by raising the "Z" axis for a predetermined time, then extending the "Y" axis assembly 18 until the limit switch 42 associated therewith is activated. The "Z" axis is then lowered to the position of a "home" limit switch 32, and the hand assembly releases the cartons 12 onto the pallet 14. After the first row of the cartons 12 is thus deposited on the pallet 14, the hand assembly 20 is withdrawn to the initial, or "home", position over the infeed conveyor 44. That is, the "Z" axis raises in accordance with a timer signal from the control circuitry, the "Y" axis retracts until the "home" limit switch 42 is actuated, and the "Z" axis lowers until the "home" limit switch 32 is actuated. When the next row of the cartons 12 has been accumulated, the "Z" axis raises for a predetermined time then the "Y" axis assembly 18 is extended until the second photodetector 64 detects the inner edge of the previously deposited first row of the cartons 12. The "Z" axis is then again lowered until the "home" limit switch 32 is actuated. The second row of the cartons 12 is then released and is deposited on the pallet 14 in close proximity to the first row. Operation in this manner continues until the first layer of the cartons 12 on the pallet 14 is completed.

To form the second layer of the cartons 12 on the pallet 14, the horizontal arm 18 is first raised along the "Z" axis 16 until the first proximity detector 62 clears the top of the first layer. Once sufficient vertical clearance over the previously deposited layer is established, the first row of the second layer is constructed by extending the "Y" axis assembly 18 until the limit switch 42 associated therewith is actuated, which will then lower the "Z" axis a predetermined distance. (This distance is readily adjustable by adjusting a timer in the control circuitry.) After the first row of the second layer is thus positioned and deposited, subsequent rows are constructed by extending the "Y" axis assembly 18 until the second proximity detector 64 detects the inner edge of the cartons 12 already in place in the second layer. Operation continues in this manner until the requisite layers have been formed on the pallet 14. Once the pallet 14 is fully loaded, it is removed from the pallet conveyor 48; and a new pallet is brought into the loading position.

If it is desired to form an interlocking loading pattern on the pallet 14, the control circuitry actuates the case turner 60 so as to turn the cartons 12 in alternate rows prior to accumulation and thereby form a desired interlocking loading pattern on the pallet 14.

The robotic palletizer 10 therefore includes a number of significant commercial advantages. The position of the cartons 12 in each row on the pallet 14 is determined either by the limit switch 42 or by actuation of the first and second proximity detectors 62 and 64. It is therefore unnecessary to monitor the actual position of the hand assembly 20 during each loading cycle. This eliminates the need for costly and complex encoding techniques (and associated hardware) for continuously sensing the location of the hand assembly 20. These features thus contribute to the overall economy and serviceability of the robotic palletizer 10. The structure of the robotic palletizer 10 also results in a rugged apparatus which can handle relatively heavy cartons and allows long term performance and straightforward servicing.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A robotic palletizer operable to automatically place and arrange a plurality of objects in a predetermined pattern on a pallet, comprising:
   a hand assembly adapted to releasably grasp one or more of the objects;
   a support assembly operable to support said hand assembly for independent movement in a substantially vertical and in a substantially horizontal direction said support assembly includes a substantially vertical column and a substantially horizontal arm assembly comprising a telescopic assembly with said hand assembly mounted at one end of said horizontal arm assembly opposite said vertical column, said horizontal arm assembly supported by and vertically movable along said vertical column; and proximity detector means including first and second proximity detectors movable with said hand assembly for sensing the presence and absence of accumulated objects on the pallet to control the position of said hand assembly for placing objects on the pallet.

2. A robotic palletizer for automatically placing and arranging objects on a pallet, comprising:
   a vertical support column;
   a horizontal arm assembly supported by and vertically movable along said vertical support column;
   a hand assembly mounted to said horizontal arm assembly for horizontal displacement relative to said vertical support column;
   means for controlling operation of said robotic palletizer, said control means adapted for storing predetermined operational data;
   an elongate support extending outwardly from said hand assembly in a direction substantially parallel to said horizontal arm assembly;
   a first proximity detector mounted on said elongate support and movable with said hand assembly and operable for generating a first control signal characteristic of the vertical position of said hand assembly;
   a second proximity detector mounted on said elongate support and movable with said hand assembly and operable for generating a second control signal characteristic of the horizontal position of said hand assembly;
   first means responsive to said first control signal and said operational data for raising said horizontal arm assembly along said vertical support column until reaching a predetermined vertical position; and
   second means responsive to said second control signal and said operational data for horizontally displacing said hand assembly until reaching a predetermined horizontal position.

* * * * *